United States Patent
Lens et al.

(10) Patent No.: US 10,717,931 B2
(45) Date of Patent: Jul. 21, 2020

(54) CURING OF EPOXY RESINS WITH PHOSPHONATE OLIGOMERS

(71) Applicant: FRX POLYMERS, INC., Chelmsford, MA (US)

(72) Inventors: Jan-Pleun Lens, Boston, MA (US); Lawino Kagumba, Cambridge, MA (US)

(73) Assignee: FRX POLYMERS, INC., Chelmsford, MA (US)

(*) Notice: Subject to any disclaimer, the term of this patent is extended or adjusted under 35 U.S.C. 154(b) by 168 days.

(21) Appl. No.: 15/863,143

(22) Filed: Jan. 5, 2018

(65) Prior Publication Data

US 2018/0187084 A1 Jul. 5, 2018

Related U.S. Application Data

(60) Provisional application No. 62/442,774, filed on Jan. 5, 2017.

(51) Int. Cl.
| | |
|---|---|
| *C09K 21/14* | (2006.01) |
| *C08G 79/04* | (2006.01) |
| *C08G 59/40* | (2006.01) |
| *C07F 9/141* | (2006.01) |
| *C09D 5/18* | (2006.01) |
| *C09D 163/00* | (2006.01) |
| *C07F 9/40* | (2006.01) |
| *C08L 63/00* | (2006.01) |
| *C09D 7/63* | (2018.01) |
| *C08K 5/5357* | (2006.01) |

(52) U.S. Cl.
CPC .............. *C09K 21/14* (2013.01); *C07F 9/141* (2013.01); *C07F 9/4084* (2013.01); *C08G 59/4071* (2013.01); *C08G 79/04* (2013.01); *C08L 63/00* (2013.01); *C09D 5/18* (2013.01); *C09D 7/63* (2018.01); *C09D 163/00* (2013.01); *C08K 5/5357* (2013.01)

(58) Field of Classification Search
CPC .... C09K 21/14; C08G 79/04; C08G 59/4071; C07F 9/141; C09D 5/18; C09D 163/00; C08K 5/5357
USPC .......................................................... 524/610
See application file for complete search history.

(56) References Cited

U.S. PATENT DOCUMENTS

| | | | |
|---|---|---|---|
| 3,671,469 A | 6/1972 | Doorenbos | |
| 4,033,927 A * | 7/1977 | Borman | ............... C08K 5/5333 524/125 |
| 8,530,044 B2 * | 9/2013 | Kagumba | ............. C07F 9/4006 428/304.4 |

FOREIGN PATENT DOCUMENTS

| | | | |
|---|---|---|---|
| CN | 102775442 A | * | 11/2012 |
| EP | 2816048 A1 | | 12/2014 |
| JP | 2014040685 A | * | 3/2014 |
| WO | 2008073872 A1 | | 6/2008 |

OTHER PUBLICATIONS

Translation of CN 102775442, Nov. 14, 2012. (Year: 2012).*
Translation of JP 2014-040685 (Patent Application 2012-183694), Mar. 6, 2014. (Year: 2014).*

* cited by examiner

*Primary Examiner* — Hui H Chin
(74) *Attorney, Agent, or Firm* — Pepper Hamilton LLP

(57) ABSTRACT

Embodiments described herein are directed to oligomeric phosphonates and polyphosphonates that have non-reactive end groups, methods for making such oligomeric phosphonates and polyphosphonates, and compositions containing such oligomeric phosphonates and polyphosphonates. The oligomeric phosphonates and polyphosphonates of such embodiments may be incorporated into engineering polymeric into which they are mixed to make polymer compositions having good flame retardancy and mechanical properties.

19 Claims, 2 Drawing Sheets

CURING OF EPOXY RESINS WITH PHOSPHONATE OLIGOMERS

CROSS-REFERENCE TO RELATED APPLICATIONS

This application claims priority to and benefit of U.S. Provisional Patent Application Ser. No. 62/442,774 filed Jan. 5, 2017, entitled "Curing Of Epoxy Resins With Phosphonate Oligomers With No Phenolic-OH End-Groups," which is hereby incorporated herein by reference in its entirety.

GOVERNMENT INTERESTS

Not Applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

The state-of-the-art approach to rendering polymers flame retardant is to use additives such as brominated compounds or compounds containing aluminum and/or phosphorus. Use of the additives with polymer can have a deleterious effect on the processing characteristics and/or the mechanical performance of articles produced from them. In addition, some of these compounds are toxic, and can leach into the environment over time making their use less desirable. In some countries, certain brominated additives are being phased-out of use because of environmental concerns. Disclosed herein are improved approaches for rendering polymers flame retardant.

SUMMARY OF THE INVENTION

Some embodiments provide a composition comprising oligomeric phosphonates, wherein at least about 50% of the total oligomeric phosphonates have one or more non-reactive end-groups.

In some embodiments, the oligomeric phosphonate comprises an oligophosphonate, random or block co-oligo(phosphonate ester) and co-oligo(phosphonate carbonate).

In some embodiments, the oligomeric phosphonates comprise linear oligomeric phosphonates, branched oligomeric phosphonates, or a combination thereof.

In some embodiments, the oligomeric phosphonates comprise a number averaged molecular weight of from about 500 g/mole to about 5000 g/mole.

In some embodiments, the oligomeric phosphonates comprise units derived from bisphenol.

In some embodiments, the oligomeric phosphonate comprises units of Formula I:

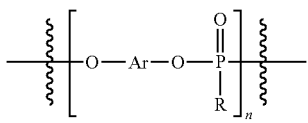

wherein: Ar is an aromatic group and —O—Ar—O— is derived from a dihydroxy compound having one or more aryl rings;

R is a $C_{1-20}$ alkyl, $C_{2-20}$ alkene, $C_{2-20}$ alkyne, $C_{5-20}$ cycloalkyl, or $C_{6-20}$ aryl; and n is an integer from 2 to about 20.

In some embodiments, —O—Ar—O— is derived from resorcinol, hydroquinone, bisphenol A, bisphenol F, and 4,4'-biphenol, phenolphthalein, 4,4'-thiodiphenol, 4,4'-sulfonyldiphenol, 3,3,5-trimethylcyclohexyldiphenol, or combinations thereof.

In some embodiments, wherein the oligophosphonates comprise termini and the non-reactive end groups comprise from about 80% to about 99% of the termini. In some embodiments, the non-reactive end groups comprise about 90% to about 98% of the termini. In some embodiments, the non-reactive end groups comprise greater than 90% of the total termini of the oligomeric phosphonates.

In some embodiments, the termini further comprise less than 40% of reactive end groups. In some embodiments, the reactive end groups comprise about 15% to about 0.2% of the total number of termini. In some embodiments, the reactive end groups comprise about 10% to about 0.5%. In some embodiments, the reactive end groups comprise phenolic-OH end groups and the total termini comprise less than 60% phenolic-OH end groups. In some embodiments, the termini comprise more than 80% phenyl end groups. In some embodiments, the termini comprise less than about 40% Bis-OH end groups. In some embodiments, reactive end groups comprise aromatic hydroxyl end groups.

Some embodiments, further comprising one or more thermoset polymer. In some embodiments, the one or more thermoset polymer is an epoxy. Some embodiments, further comprise at least one hardener.

Some embodiments provide a composition comprising oligomeric phosphonates having a KOH number smaller than 40.

Some embodiments provide a method for preparing a non-reactive oligomeric phosphonate, the method comprising combining a phosphonate monomer and co-monomer to create a monomer mixture, the monomer mixture comprising a molar excess of the phosphonate monomer; heating the monomer mixture; adding a oligomerization catalyst to the monomer mixture to create a reaction mixture; and maintaining a polymerization temperature.

In some embodiments, the phosphonate monomer is selected from phosphonic acid diaryl esters or diaryl phosphonates.

In some embodiments, the co-monomer is selected from an aromatic dihydroxy compound, a dihydric phenol, a bisphenol, and the like or combinations thereof.

In some embodiments, the oligomerization catalyst is a phosphonium catalyst.

In some embodiments, the phosphonium catalyst comprises tetraphenylphosphonium phenolate.

Some embodiments provide an article of manufacture comprising oligomeric phosphonates, wherein about 60% to about 100% of the total of oligomeric phosphonates have two or more non-reactive end-groups.

In some embodiments, the article of manufacture is selected from the group consisting of coatings on plastics, metals, ceramic, or wood products, free-standing films, fibers, foams, molded articles, fiber reinforced composites, support parts, electrical components, electrical connectors, printed wiring laminated boards, housings, subcomponents and components, televisions, computers, laptop computers, printers, cell phones, video games, DVD players, stereos, digital music players, hand held video players, and touch screens.

In some embodiments, the article of manufacture is a laminate or a fiber reinforced composite used in electrical components, electrical connectors, printed wiring boards, printed circuit boards, televisions, computers, laptop computers, printers, copiers, scanners, cell phones, video games, DVD players, stereos, digital music players, hand held video players, or touch screens.

These and other variations and uses will be apparent from this disclosure which is meant to be illustrative, rather than limiting, in nature.

DETAILED DESCRIPTION

Figure 1:
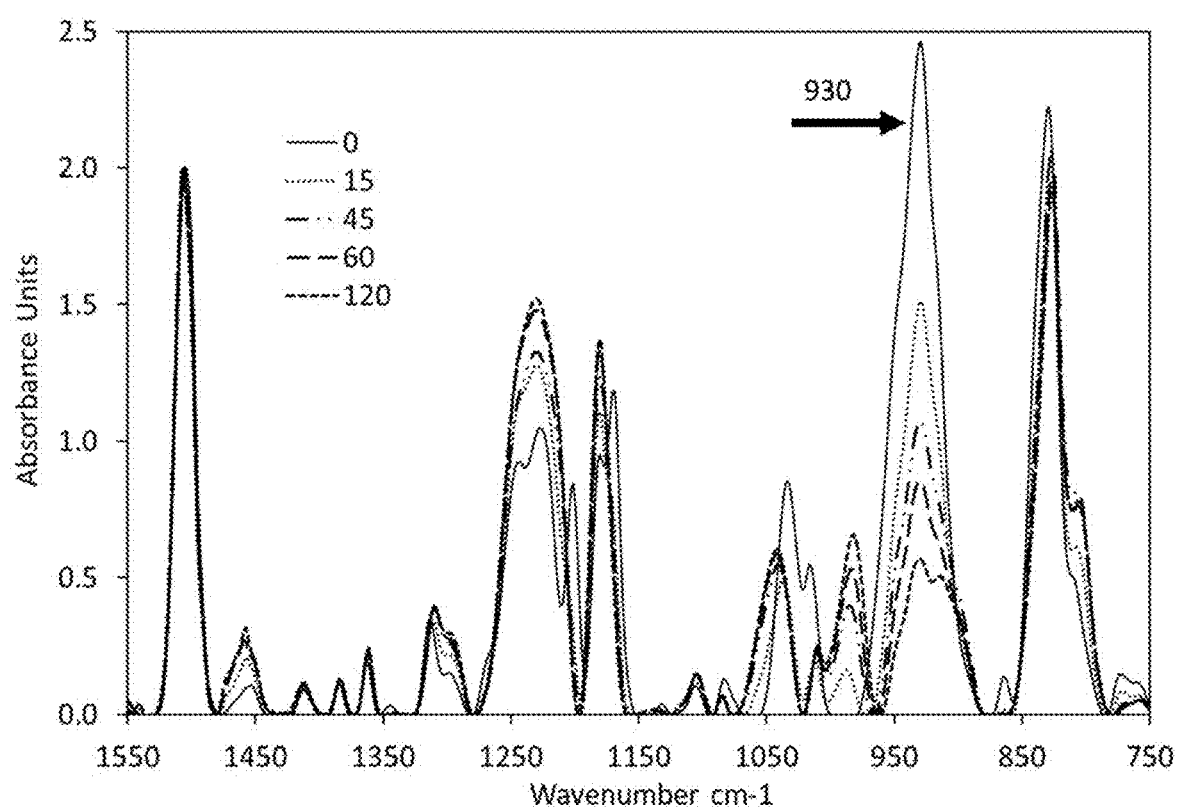
FIG. 1 is a typical FTIR spectra of the epoxy-phosphonate formulation and changes over time

The above summary of the present invention is not intended to describe each illustrated embodiment or every possible implementation of the present invention. The detailed description, which follows, particularly exemplifies these embodiments.

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

"Optional" or "optionally" means that the subsequently described event or circumstance may or may not occur, and that the description includes instances where the event occurs and instances where it does not.

"Substantially no" means that the subsequently described event may occur at most about less than 10% of the time or the subsequently described component may be at most about less than 10% of the total composition, in some embodiments, and in others, at most about less than 5%, and in still others at most about less than 1%.

The term "carbonate" as used herein is given its customary meaning, e.g., a salt of carbonic acid containing the divalent, negative radical CO or an uncharged ester of this acid. A "diaryl carbonate" is a carbonate with at least two aryl groups associated with the CO radical, the most predominant example of a diaryl carbonate is diphenyl carbonate; however, the definition of diaryl carbonate is not limited to this specific example.

The term "aromatic dihydroxide" is meant to encompass any aromatic compound with at least two associated hydroxyl substitutions. Examples of "aromatic hydroxides" include but are not limited to benzene diols such as hydroquinone and any bisphenol or bisphenol containing compounds.

The term "alkyl" or "alkyl group" refers to a branched or unbranched hydrocarbon or group of 1 to 20 carbon atoms, such as but not limited to methyl, ethyl, n-propyl, isopropyl, n-butyl, isobutyl, t-butyl, octyl, decyl, tetradecyl, hexadecyl, eicosyl, tetracosyl and the like. "Cycloalkyl" or "cycloalkyl groups" are branched or unbranched hydrocarbons in which all or some of the carbons are arranged in a ring such as but not limited to cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic in nature. Aryls may include but are not limited to phenyl, napthyl, biphenyl ring systems and the like. The aryl group may be unsubstituted or substituted with a variety of substituents including but not limited to alkyl, alkenyl, halide, benzylic, alkyl or aromatic ether, nitro, cyano and the like and combinations thereof.

"Substituent" refers to a molecular group that replaces a hydrogen in a compound and may include but is not limited to trifluoromethyl, nitro, cyano, C1-C20 alkyl, aromatic or aryl, halide (F, Cl, Br, I), C1-C20 alkyl ether, C1-C20 alkyl ester, benzyl halide, benzyl ether, aromatic or aryl ether, hydroxy, alkoxy, amino, alkylamino (—NHR'), dialkylamino (—NR'R") or other groups which do not interfere with the formation of the diaryl alkylphosphonate.

As defined herein, an "arylol" or an "arylol group" is an aryl group with a hydroxyl, OH, group substituent on the aryl ring. Non-limiting examples of an arylol are phenol, naphthol, and the like. A wide variety of arlyols may be used in the embodiments of the invention and are commercially available.

The term "alkanol" or "alkanol group" refers to a compound including an alkyl of 1 to 20 carbon atoms or more having at least one hydroxyl group substituent. Examples of alkanols include but are not limited to methanol, ethanol, 1- and 2-propanol, 1,1-dimethylethanol, hexanol, octanol and the like. Alkanol groups may be optionally substituted with substituents as described above.

The term "alkenol" or "alkenol group" refers to a compound including an alkene with 2 to 20 carbon atoms or more having at least one hydroxyl group substituent. The hydroxyl may be arranged in either isomeric configuration (cis or trans). Alkenols may be further substituted with one or more substituents as described above and may be used in place of alkanols in some embodiments of the invention. Alkenols are known to those skilled in the art and many are readily available commercially.

The terms "flame retardant," "flame resistant," "fire resistant," or "fire resistance," as used herein, means that the composition exhibits a limiting oxygen index (LOI) of at least 27. "Flame retardant," "flame resistant," "fire resistant," or "fire resistance," may also be tested by measuring the after-burning time in accordance with the UL test (Subject 94). In this test, the tested materials are given classifications of UL-94 V-0, UL-94 V-1 and UL-94 V-2 on the basis of the results obtained with the ten test specimens. Briefly, the criteria for each of these UL-94-V-classifications are as follows:

UL-94 V-0: the total flaming combustion for each specimen after removal of the ignition flame should not exceed 10 seconds and the total flaming combustion for 5 specimens should not exceed 50 seconds. None of the test specimens should release and drips which ignite absorbent cotton wool.

UL-94 V-1: the total flaming combustion for each specimen after removal of the ignition flame should not exceed 30 seconds and the total flaming combustion for 5 specimens should not exceed 250 seconds. None of the test specimens should release any drips which ignite absorbent cotton wool.

UL-94 V-2: the total flaming combustion for each specimen after removal of the ignition flame should not exceed 30 seconds and the total flaming combustion for 5 specimens should not exceed 250 seconds. Test specimens may release flaming particles, which ignite absorbent cotton wool.

Fire resistance may also be tested by measuring after-burning time. These test methods provide a laboratory test procedure for measuring and comparing the surface flammability of materials when exposed to a prescribed level of radiant heat energy to measure the surface flammability of materials when exposed to fire. The test is conducted using small specimens that are representative, to the extent possible, of the material or assembly being evaluated. The rate at which flames travel along surfaces depends upon the physical and thermal properties of the material, product or assembly under test, the specimen mounting method and orientation, the type and level of fire or heat exposure, the availability of air, and properties of the surrounding enclosure. If different test conditions are substituted or the end-use conditions are changed, it may not always be possible by or from this test to predict changes in the fire-test-response characteristics measured. Therefore, the results are valid only for the fire test exposure conditions described in this procedure.

The state-of-the-art approach to rendering polymers flame retardant is to use additives such as brominated compounds or compounds containing aluminum and/or phosphorus. Use of the additives with polymer can have a deleterious effect on the processing characteristics and/or the mechanical performance of articles produced from them. In addition, some of these compounds are toxic, and can leach into the environment over time making their use less desirable. In some countries, certain brominated additives are being phased-out of use because of environmental concerns.

"Molecular weight," as used herein, can be determined by gel permeation chromatography (GPC). GPC provides information about the molecular weight and molecular weight distribution of a polymer. A reduction in molecular weight causes loss of mechanical properties such as strength and toughness. It is known that the molecular weight distribution of a polymer is important to properties such as thermo-oxidative stability, toughness, melt flow, and fire resistance, for example, low molecular weight polymers drip more when burned.

Embodiments of the invention are directed to oligophosphonates, random or block co-oligo(phosphonate ester)s, and random or block co-oligo(phosphonate carbonate)s, and methods for making these oligomeric phosphonates, random or block co-oligo(phosphonate ester)s, and random or block co-oligo(phosphonate carbonate)s. Additional embodiments include polymer compositions including such oligomeric phosphonates, random or block co-oligo(phosphonate ester)s, and random or block co-oligo(phosphonate carbonate)s, and another monomer, oligomer, or polymer, methods for preparing such compositions, articles of manufacture including oligomeric phosphonates, random or block co-oligo(phosphonate ester)s, and random or block co-oligo(phosphonate carbonate)s, and articles of manufacture including polymer compositions. In such embodiments, the oligophosphonates, random or block co-oligo(phosphonate ester)s and co-oligo(phosphonate carbonate)s (collectively "phosphonate oligomers") may include mostly substantially non-reactive end groups such as, for example, (optionally substituted) phenyl or phenyl phosphonate ester end groups. Despite having mostly substantially non-reactive end groups, the phosphonate oligomers of such embodiments ("non-reactive phosphonate oligomers") can be incorporated into base polymers such as epoxies to impart flame resistance. Once incorporated, the non-reactive phosphonate oligomers provide excellent flame retardancy while not detracting from the mechanical properties of the base polymer. Known phosphonate oligomers have mostly reactive end groups, often having up to 80% or more of the oligomer chains having at least two reactive groups. In particular, such known phosphonate oligomers often have reactive end groups in the form of hydroxyl (e.g. phenolic-OH) that account for up to 80% or more of the end groups. The non-reactive phosphonate oligomers described herein show that with 40% or less reactive groups and chain ends, indeed, in some embodiments, even with almost no reactive end groups at all, the desired results still can be achieved.

The phosphonate oligomers of such embodiments may be linear or branched. In general, the concentration of reactive end groups, such as hydroxyl, epoxy, vinyl, vinyl ester, isopropenyl, isocyanate, or combinations thereof, based on the total number of termini for the oligomeric phosphonates may be very low. For example, oligomeric phosphonates may have a percentage of the total number of termini having reactive end groups of from about 40% to about 0%, about 15% to about 0.2%, or about 10% to about 0.5%.

In other embodiments, greater than 60% of the total termini of the oligomeric phosphonate may have a non-reactive end group. For example, in some embodiments, the concentration of non-reactive end groups based on the total number of termini for the oligomeric phosphonates may be high. For example, oligomeric phosphonates may have a percentage of the total number of termini having non-reactive end groups of from about 60% to about 100%, about 80% to 100%, about 85% to about 99%, or about 90% to about 98%. In other embodiments, greater than 90% of the total termini of the oligomeric phosphonate may have a non-reactive end group. For branched oligomeric phosphonates of other embodiments, the percentage of the total number of termini having non-reactive end groups may be from about 50% to 100%, about 75% to about 95%, or about 80% to about 90%, and in certain embodiments, greater than 80% of the total termini for a branched oligomeric phosphonate may have a non-reactive end group.

For simplicity, throughout this disclosure, the terms, "oligomeric phosphonates," "phosphonate oligomers," and the like are to be construed as referring to any type of oligomer described herein including oligophosphonates, random or block co-oligo(phosphonate ester)s, and random or block co-oligo(phosphonate carbonate)s. Such oligomers encompassed by these terms can be linear, lightly branched, indicating a relatively small number of branches, for example, 1 to about 5 branches per oligomer, indicating a relatively high number of branches, for example, greater than 5. While individual types of oligomers may be called out in specific exemplary embodiments, any oligomeric phosphonate described herein can be used in such exemplary embodiments. For example, an exemplary stating that an oligomeric phosphonate is used can be carried out with a linear or branched oligomeric phosphonate that can be an oligophosphonate, random or block co-oligo(phosphonate ester), and random or block co-oligo(phosphonate carbonate) type oligomeric phosphonate.

Embodiments of the invention are not limited by the type of phosphonate component included and may include, for example, co-oligo(phosphonate ester)s, or co-oligo(phosphonate carbonate)s, phosphonate oligomers, branched phosphonate oligomers, or hyperbranched phosphonates, and in certain embodiments, the phosphonate component may have the structures described and claimed in U.S. Pat. No. 7,645,850, U.S. Pat. No. 7,816,486, U.S. Pat. No. 8,389,664, U.S. Pat. No. 8,563,638, U.S. Pat. No. 8,648,163, U.S. Pat. No. 8,779,041, U.S. Pat. No. 8,530,044, U.S. Pat. No. 9,745,424, each of which is hereby incorporated by reference in its entirety.

Such phosphonate components may include repeating units derived from diaryl alkylphosphonates or diaryl arylphosphonates. For example, in some embodiments, such phosphonate components include structural units illustrated by Formula I:

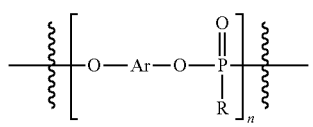

where Ar is an aromatic group and —O—Ar—O— may be derived from an aromatic dihydroxy compound or aromatic diol, R is a $C_{1-20}$ alkyl, $C_{2-20}$ alkene, $C_{2-20}$ alkyne, $C_{5-20}$ cycloalkyl, or $C_{6-20}$ aryl, and n is an integer from 2 to about 20, 2 to about 10, or 2 to about 5, or any integer between these ranges.

The term "aromatic diol" is meant to encompass any aromatic or predominately aromatic compound with at least two associated hydroxyl substitutions of the formula (II)

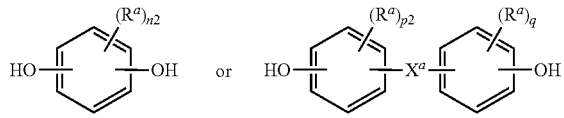

wherein n2, p2, and q are each independently 0, 1, 2, 3, or 4; $R^a$ is independently at each occurrence unsubstituted or substituted $C_{1-10}$ hydrocarbyl; and $X^a$ is a single bond, —O—, —S—, —S(O)—, —S(O)$_2$—, —C(O)—, or a C1-18 hydrocarbylene, which can be cyclic or acyclic, aromatic or non-aromatic, and can further comprise one or more heteroatoms selected from oxygen, nitrogen, sulfur, silicon, or phosphorus. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. The term "substituted" means including at least one substituent such as a hydroxyl, amino, thiol, carboxyl, carboxylate, amide, nitrile, sulfide, disulfide, nitro, $C_{1-18}$ alkyl, $C_{1-18}$ alkoxyl, $C_{6-18}$ aryl, $C_{6-18}$ aryloxyl, $C_{7-18}$ alkylaryl, or $C_{7-18}$ alkylaryloxyl. The term "substituted" further permits inclusion of halogens (i.e., F, Cl, Br, I).

Some illustrative examples of specific dihydroxy compounds include the following: bisphenol compounds such as 4,4'-dihydroxybiphenyl, 1,4-dihydroxynaphthalene, 1,5-dihydroxynaphthalene, 1,6-dihydroxynaphthalene, 2,6-dihydroxynaphthalene, 2,7-dihydroxynaphthalene, bis(4-hydroxyphenyl)methane, bis(4-hydroxyphenyl)phenylmethane, bis(4-hydroxyphenyl)diphenylmethane, bis(4-hydroxy-3,5-dimethylphenyl)methane, bis(4-hydroxy-3,5-dichlorophenyl)methane, bis(4-hydroxy-3,5-dibromophenyl)methane, bis(4-hydroxy-3-methylphenyl)methane, bis(4-hydroxy-3-chlorophenyl)methane, bis(4-hydroxyphenyl)-1-naphthylmethane, 1,2-bis(4-hydroxyphenyl)ethane, 1,1-bis(4-hydroxyphenyl)-1-phenylethane, 2,2-bis(4-hydroxyphenyl)propane ("bisphenol A" or "BPA"), 2-(4-hydroxyphenyl)-2-(3-hydroxyphenyl)propane, 1,1-bis(4-hydroxyphenyl)cyclopentane, 1,1-bis(4-hydroxyphenyl)cyclohexane, 1,1-bis(4-hydroxy-3-methylphenyl)cyclohexane, 1,1-bis-(4-hydroxyphenyl)-3,3,5-trimethylcyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 4,4'-dihydroxybenzophenone, bis(4-hydroxy-3,5-dimethylphenyl)ketone, bis(4-hydroxy-3,5-dichlorophenyl)ketone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl) sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), phenolphthalein and phenolphthalein derivatives, 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, chlorohydroquinone, acetoxyhydroquinone, and nitrohydroquinone.

In some embodiments, a single aromatic diol may be used, and in other embodiments, various combinations of such aromatic diols may be incorporated into the oligomers. The phosphorous content of phosphonate component may be controlled by the molecular weight (MW) of the aromatic diol used in the oligomeric phosphonates. A lower molecular weight aromatic diol may produce an oligomeric phosphonate with a higher phosphorus content. An aromatic diol, such as resorcinol, hydroquinone, or a combination thereof or similar low molecular weight aromatic diols may be used to make oligomeric phosphonates. The phosphorus content, expressed in terms of the weight percentage, of the phosphonate oligomers, may be in the range from about 2 wt. % to about 18 wt. %, about 4 wt. % to about 16 wt. %, about 6 wt. % to about 14 wt. %, about 8 wt. % to about 12 wt. %, or a value between any of these ranges. In some embodiments, phosphonate oligomers prepared from bisphenol A or hydroquinone may have phosphorus contents of 10.5 wt. % and 18 wt. %, respectively.

In other embodiments, the co-oligo(phosphonate carbonate), or co-oligo(phosphonate ester), may have structures such as, but not limited to, those structures of Formulae III and IV, respectively:

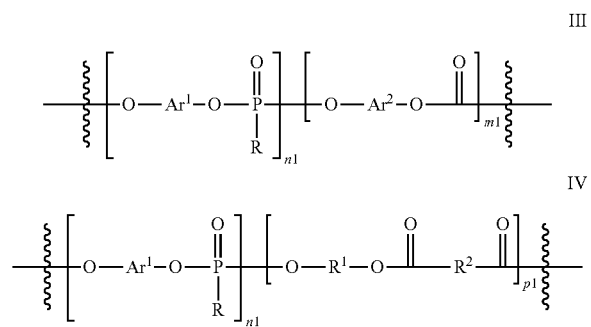

and combinations thereof, where $Ar^1$ and $Ar^2$ are each, independently, an aromatic group and —O—$Ar^1$—O— and —O—$Ar^2$—O— may be derived from a dihydroxy compound as described by structure (II).

R is a $C_{1-20}$ alkyl, $C_{2-20}$ alkene, $C_{2-20}$ alkyne, $C_{5-20}$ cycloalkyl, or $C_{6-20}$ aryl. $R^1$ may be a $C_{1-20}$ alkylene or cycloalkylene, such as methylene, ethylene, propylene, butylene, pentylene, and the like, and in particular embodiments, $R^1$ can be derived from aliphatic diols such as, but not limited to, 1,4-cyclohexyldimethanol, 1,4-butane diol, 1,3-propane diol, ethylene diol, ethylene glycol, and the like and combinations thereof. $R^2$ is, independently, a $C_{1-20}$ alkylene, $C_{2-20}$ alkylenylene, $C_{2-20}$ alkylynylene, $C_{5-20}$ cycloalkylene, or $C_{6-20}$ arylene, each $Z^1$ is, independently, $C_{1-20}$ alkylene, $C_{2-20}$ alkylenylene, $C_{2-20}$ alkylynylene, $C_{5-20}$ cycloalkylene, or $C_{6-20}$ arylene. In certain embodiments, $R^2$ can be derived from adipic acid, dimethyl terephthalic acid, terephthalic acid, isophthalic acid, naphthalene dicarboxylic acid and the like or derivatives thereof or combinations thereof. In certain embodiments, $R^2$ may be an aromatic group such as naphthalene, phenylene, biphenylene, propane-2,2-diyldibenzylene, and in some embodiments, $R^2$ can be derived from, for example, dimethyl terephthalate, dimethyl isophthalate, dimethyl naphthalate, and the like and combinations thereof. Thus, $R^2$ may be, for example, naphthalene, phenyl, both of which may be substituted at any position on the rings. Such co-oligo(phosphonate carbonates), or co-oligo(phosphonate esters) may be block co-oligo(phosphonate carbonates) or block co-oligo(phosphonate esters) in which each m1, n1, and p1 can be the same or different and can, independently, be an integer from 1 to about 20, 1 to about 10, or 2 to about 5, or any integer between these ranges and the cooligomers contain distinct repeating phosphonate and carbonate blocks or phosphonate and ester blocks.

As indicated by the term "random" the monomers of the "random co-oligo(phosphonate carbonate)s" or "random co-oligo(phosphonate ester)s of various embodiments are incorporated into polymer chain randomly, such that the oligomeric phosphonate chain can include alternating phosphonate and carbonate or ester monomers or short segments in which several phosphonate or carbonate or ester monomers are linked by an aromatic dihydroxide. The length of such segments may vary within individual random co-oligo(phosphonate carbonate)s or co-oligo(phosphonate ester).

In particular embodiments, the Ar, $Ar^1$, and $Ar^2$ may be bisphenol A and R may be a methyl group providing oligomeric phosphonates having non-reactive end-groups including random and block co-oligo(phosphonate carbonate)s and co-oligo(phosphonate ester)s. Such compounds may have structures such as, but not limited to, structures of Formulae V, VI, and VII:

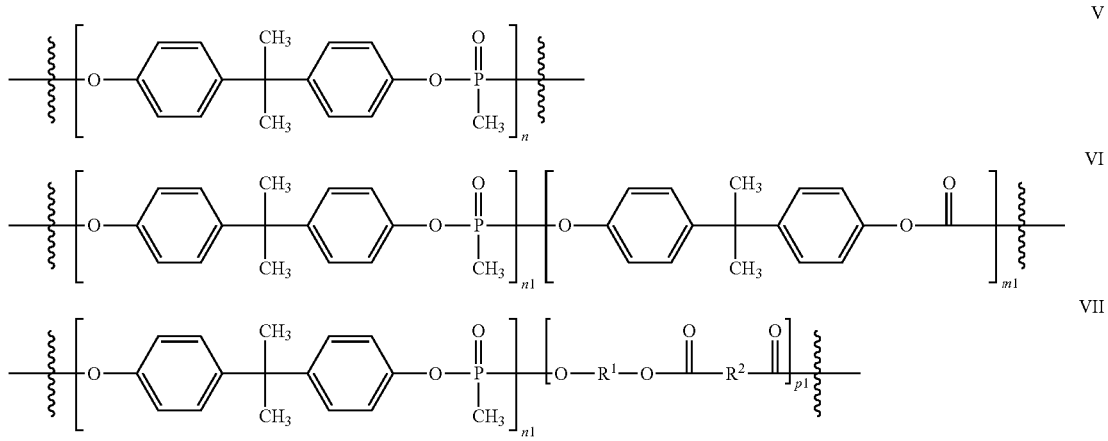

and combinations thereof, where each of m, n, p, m1, n1, p1 and $R^1$ and $R^2$ are defined as described above.

With particular regard to co-oligo(phosphonate ester)s, co-oligo(phosphonate carbonate)s, block co-oligo(phosphonate ester)s, and block co-oligo(phosphonate carbonate)s, without wishing to be bound by theory, oligomers containing carbonate components, whether as carbonate blocks or randomly arranged carbonate monomers, may provide improved toughness over oligomers derived solely from phosphonates. Such co-oligomers may also provide higher glass transition temperature, Tg, and better heat stability over phosphonate oligomers.

The phosphonate and carbonate content of the oligomeric phosphonates, random or block co-oligo(phosphonate carbonate)s and co-oligo(phosphonate ester)s may vary among embodiments, and embodiments are not limited by the phosphonate and/or carbonate content or range of phosphonate and/or carbonate content. For example, in some embodiments, the co-oligo(phosphonate carbonate)s or co-oligo(phosphonate ester)s may have a phosphorus content, of from about 1% to about 20% by weight of the total oligomer, and in other embodiments, the phosphorous content may be from about 2% to about 15% by weight of the total oligomer, about 2% to about 10% by weight of the total oligomer, or about 2% to about 12% by weight of the total oligomer.

In some embodiments, the molecular weight (weight average molecular weight as determined by gel permeation chromatography based on polystyrene calibration) range of the oligophosphonates, random or block co-oligo(phosphonate ester)s and co-oligo(phosphonate carbonate)s may be from about 500 g/mole to about 18,000 g/mole or any value within this range. In other embodiments, the molecular weight range may be from about 1,500 g/mole to about 15,000 g/mole, about 3,000 g/mole to about 10,000 g/mole, or any value within these ranges. In still other embodiments, the molecular weight range may be from about 700 g/mole to about 9,000 g/mole, about 1,000 g/mole to about 8,000 g/mole, about 3,000 g/mole to about 4,000 g/mole, or any value within these ranges.

The number average molecular weight (Mn), in such embodiments, may be from about 500 g/mole to about 10,000 g/mole, or from about 1,000 g/mole to about 5,000 g/mole, and in certain embodiments the Mn may be greater than about 1,200 g/mole. The molecular weight distribution (i.e., Mw/Mn) of such oligomeric phosphonates may be from about 1 to about 7 in some embodiments and from about 1 to about 5 in other embodiments. Without wishing to be bound by theory, the relatively high molecular weight and narrow molecular weight distribution of the oligomeric phosphonates of the invention may impart a superior combination of properties. For example, the oligomeric phosphonates of embodiments are extremely flame retardant and exhibit superior hydrolytic stability and can impart such characteristics on a polymer combined with the oligomeric phosphonates to produce polymer compositions such as those described below. In addition, the oligomeric phosphonates of embodiments, generally, exhibit an excellent combination of processing characteristics including, for example, good thermal and mechanical properties.

Some embodiments are directed to methods for making the oligomeric phosphonate of the invention. Linear oligomers such as those described above may generally be prepared by the methods described in U.S. Pat. Nos. 6,861,499, 7,816,486, 7,645,850, and 7,838,604 and U.S. Publication No. 2009/0032770, which are incorporated by reference above. In some embodiments, the polymerization time may be reduced to reduce the number of monomeric units incorporated into the oligomer.

Other embodiments are directed to methods for making non-reactive oligomers. For example, in various embodiments, oligomers can be prepared by providing mixtures of monomers, such as, for example, a phosphonate and a co-monomer, in the case of co-oligo(phosphonate carbonate)s, a phosphonate, a co-monomer, and carbonate monomer or oligomer, or in the case of co-oligo(phosphonate ester)s, the phosphonate and a co-monomer can be combined with an ester monomer or oligomer. The reaction mixture may include a monomer mixture, such as those described above, a branching agent, a catalyst, and various solvents and co-reagent. In some embodiments, such methods may include the step of heating the reaction mixture, and in other embodiments, the method may include applying a vacuum to the reaction mixture during heating to remove volatile by-products of the reaction.

In certain embodiments, the components of the monomer mixture may vary among embodiments and may depend on the type of oligomer or co-oligomer to be synthesized. For example, certain embodiments include phosphonate monomers such as phosphonic acid diaryl esters or diaryl phosphonates. Such phosphonate monomers may have any structure, and in some embodiments, may be of general Formula VIII:

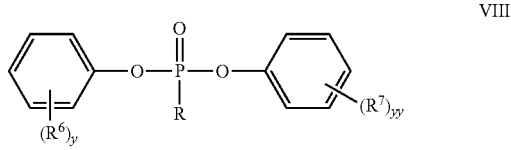

where each $R^6$ and each $R^7$ can independently be a hydrogen, $C_{1-4}$ alkyl, each y and yy are, independently integers, of 1 to 5, and R can be $C_{1-20}$ alkyl, $C_{2-20}$ alkene, $C_{2-20}$ alkyne, $C_{5-20}$ cycloalkyl, or $C_{6-20}$ aryl. In some embodiments, the phosphonic acid diaryl ester may be diphenyl methylphosphonate (DPP) or methyldiphenoxyphosphine oxide.

Without wishing to be bound by theory, the use of high purity diaryl alkylphosphonate or optionally substituted diaryl alkylphosphonate, and in particular embodiments, high purity DPP, in the preparation of the oligomeric phosphonates of the invention may provide improved properties over similar polymers or oligomers described in the prior art. The term "high purity" with reference to diaryl alkylphosphonate or optionally substituted diaryl alkylphosphonate and DPP describes a total acidic component of less than about 0.15% by weight, less than about 0.10% by weight, and in certain embodiments, less than about 0.05% by weight. Such acidic components are known in the art and may include, but are not limited to, phosphoric acid, phosphonic acid, methyl phosphonic acid, and methyl phosphonic acid mono phenylester. Because the diaryl alkylphosphonate, optionally substituted diaryl alkylphosphonate, or DPP used in the preparation of the random copolymers of the invention include low levels of such acidic components, the oligomeric phosphonates produced using these high purity phosphonate monomers may include significantly reduced levels of the acidic component contaminants. In some embodiments, the oligomeric phosphonates of embodiments may include substantially no acidic component contaminants, and in other embodiments, the oligomeric phosphonates of embodiments may include, for example, total acidic components of less than about 0.15% by weight, less than about 0.10% by weight, and in certain embodiments, less than about 0.05% by weight.

The co-monomer may be any monomer, oligomer or polymer capable of reacting with the phosphonate monomers described above in a polymerization reaction. For example, in some embodiments, the co-monomer may be an aromatic dihydroxy compound, a dihydric phenol, a bisphenol, and the like or combinations thereof. Particular examples of such compounds include, but are not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, 3,3,5-trimethylcyclohexyldiphenol. Any such compounds or combination of such compounds can be used in the methods of embodiments.

In embodiments that include a carbonate monomer, the carbonate monomer may be any difunctional carbonate known in the art, or combinations thereof. In some embodiments, the carbonate monomer may be a diaryl carbonate monomer such as, but not limited to, diphenyl carbonate, 4-tert-butylphenyl-phenyl carbonate, di-(4-tert-butylphenyl) carbonate, biphenyl-4-yl-phenyl carbonate, di-(biphenyl-4-yl)carbonate, 4-(1-methyl-1-phenylethyl)-phenyl-phenyl carbonate, di-[4-(1-methyl-1-phenylethyl)-phenyl]carbonate, and the like and combinations thereof. In certain embodiments, the carbonate monomer may be diphenyl carbonate.

The branching agent used in the methods of various embodiments may vary and can be included as a separate component or can be generated in situ by action of the polymerization catalyst with a dihydroxy compound. For example, in situ branching agents can be formed from dihydroxy compounds by splitting or Fries rearrangements. Without wishing to be bound by theory, a portion of bisphenol A in reaction mixtures such as those described above can spontaneously undergo a reaction that increases the number of reactive hydroxyl groups extending from the bisphenol A molecule and such bisphenol A molecules can function as branching agents. Bisphenol A and other similar aromatic dihydroxy compounds can be termed "splitable" dihydroxy compounds because they can undergo these reactions to form branching species in situ under polycondensation conditions.

In some embodiments, the branching agent may be polyfunctional acids, polyfunctional glycols, or acid/glycol hybrids. In other embodiments, oligomeric phosphonates may have units derived from tri or tetrahydroxy aromatic compounds or triaryl or tetraaryl phosphoric acid esters, triaryl or tetraaryl carbonate or triaryl or tetraaryl esters or combinations thereof such as, but not limited to, trimesic acid, pyromellitic acid, trimellitic anhydride, pyromellitic anhydride, trimethylolpropane, dimethyl hydroxyl terephthalate, pentaerythritol, and the like and combinations thereof. Such branching agents provide branch points within oligomeric phosphonate.

In particular embodiments, the branching agent may be a triaryl phosphate such as, for example, those of Formula IX:

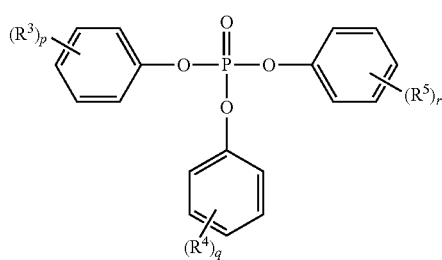

where each $R^3$, $R^4$, and $R^5$ can, independently, be a hydrogen, $C_{1-4}$ alkyl of, and each of p, q, and r are independently integers of from 1 to 5. In various embodiments, the branching agent may be 1,1,1-tris(4-hydroxyphenyl)ethane, phosphoric triaryl esters, tri and tetra functional carbonates or esters, and the like and combinations thereof, and in certain exemplary embodiments, the branching agent may be triphenyl phosphate. In certain embodiments, trihydroxy and tetrahydroxy compounds used for preparing oligomeric phosphonates of embodiments can include, but are not limited to, phloroglucinol, 4,6-dimethyl-2,4,6-tri-(4-hydroxy phenyl)-2-heptene, 4,6-dimethyl-2,4,6-tri-(4-hydroxy phenyl)-heptane, 1,3,5-tri-(4-hydroxy phenyl)-benzene, 1,1,1-tri-(4-hydroxy phenyl)-ethane, tri-(4-hydroxy phenyl)-phenyl methane, 2,2-bis-[4,4-bis-(4-hydroxy phenyl)-cyclohexyl]-propane, 2,4-bis-(4-hydroxy phenyl)isopropyl phenol, 2,6-bis-(2'-hydroxy-5'-methyl benzyl)-4-methyl phenol 2-(4-hydroxy phenyl)-2-(2,4-dihydroxy phenol)-propane, tetra-(4-hydroxy phenyl)methane, tetra-[4-(4-hydroxy phenyl isopropyl)phenoxy]-methane, 1,4-bis-(4,4"-dihydroxy triphenyl methyl)-benzene, and the like and combinations and mixtures thereof.

The amount of branching agent added to the reaction, whether the branching agent was combined with the other monomers prior to heating, added after heating has begun, or both, may be similar and can vary among embodiments. In various embodiments, the branching agent may be provided in an amount from about 0.5 mole % or about 1 mole % up to about 10 mole % or greater. For example, in some embodiments, the total branching agent provided may be 1 mole % or greater, 2 mole % or greater, 3 mole % or greater, 4 mole % or greater, 5 mole % or greater, 6 mole % or greater, 7 mole % or greater, 8 mole % or greater, 9 mole % or greater, or 10 mole % or greater. In some embodiments, a co-monomer such as an aromatic dihydroxy compound, dihydric phenol, bisphenol, or combination thereof may be provided in the monomer mixture in a molar excess over the total of the phosphonate monomer and branching agent, and in embodiments including a carbonate component, the phosphonate monomer, branching agent, and carbonate monomer. Without wishing to be bound by theory, a molar excess of the diaryl phosphonate ester compound may increase the number of aryl ester terminations in the non-reactive oligomers of the invention allowing for the production of oligomers that have predominately aryl ester terminations.

The methods of embodiments generally may require a catalyst, and any catalyst known in the art useful for facilitating transesterification or condensation may be used in connection with the methods described herein. For example, in some embodiments, the oligomerization catalyst may include a mixture of catalysts and in some cases, a co-catalyst. In some embodiments, the catalyst may be an alkaline, alkaline earth, or other metal catalyst such as, but not limited to, sodium phenolate, sodium hydroxide, or sodium citrate.

In other embodiments, catalysts useful in the methods of the invention may not contain an alkaline, alkaline earth, or other metal cation. Such catalysts can be removed by heating during the condensation reaction with other volatile components by evaporation, sublimation, or thermal decomposition. Because the material produced contains no metal, an additional advantage of the non-reactive oligomers may be improved hydrolytic stability. In particular embodiments, such oligomerization catalysts may be of Formula X:

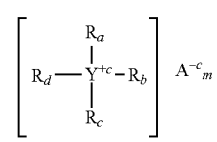

where Y can be nitrogen, phosphorous, or arsenic, +c represents the charge associated with Y, $R_a$, $R_b$, $R_c$, and $R_d$ can independently be phenyl, tert-butyl, methyl, ethyl, propyl, butyl, or other groups provided that the catalyst acts as an oligomerization catalyst, and A is a counter anion such as, but is not limited to, phenolate, acetate, borohydrides, halogen, hydroxide, propionate, formate, butyrate and the like and −c is the charge associated with the A. In some embodiments, Y is phosphorous, $R_a$, $R_b$, $R_c$, and $R_d$ are phenyl, and the anion is phenolate or acetate. In certain embodiments, the catalyst may be a phosphonium catalyst such as, for example, tetraphenylphosphonium catalyst or its derivatives and associated anion such as tetraaryl borohydride, a halide, and a substituted or unsubstituted phenolate group. In particular embodiments, the catalyst may be tetraphenylphosphonium phenolate.

The oligomerization catalyst may be added in any form. For example, the catalyst may be added to a reaction mixture or monomer mixture as a solid, such as a powder, dissolved in a solvent, or as a melt. Such catalysts may be provided in any amount necessary to promote oligomerization, and the amount of catalyst may be used to control the rate of reaction and control molecular weight. The skilled artisan can determine an appropriate amount of catalyst used in the methods embodied herein. In certain embodiments, the molar amount of a catalyst used, relative to the molar amount of co-monomer, or bisphenol, can be from about 0.00004 moles to about 0.0012 moles per one mole of co-monomer. Where an increase in molecular weight of a oligophosphonate is desired the amount of catalyst, a catalyst with a lower vapor pressure, or a lower pressure of the vessel may be used to increase molecular weight.

In some embodiments, the reaction may further include one or more co-catalysts, which can be provided in addition to the one or more catalyst to increase the rate of the oligomerization. Such co-catalysts may be, for example, salts of alkali metal salts and alkaline earth metal salts such as, for example, hydroxides, alkoxides, and aryl oxides of lithium, sodium, and potassium. In certain embodiments, the alkali metal salt may be a hydroxide, alkoxide, or aryl oxide salt of sodium, and in some embodiments, the co-catalyst may be sodium hydroxide and sodium phenolate. The amount of the co-catalyst provided may vary and may be, for example, from about 1 μg/kg to about 200 μg/kg, 5 μg/kg to 150 μg/kg, and, in certain embodiments, about 10 μg/kg to about 125 μg/kg, based in each case on the mass of aromatic dihydroxide used calculated in each case as sodium. In certain embodiments, the oligomeric phoshonates of the invention may be prepared without co-catalysts.

In general, the methods described herein include a heating step in which a reaction mixture including phosphonate monomers, co-monomers, and a catalyst are heated to a suitable reaction temperature. In such embodiments, the reaction mixture may be heated to a temperature at which the components of the reaction mixture melt and undergoes oligomerization as the melted components of the reaction mixture are stirred. The reaction is, therefore, carried out "in a melt." In some embodiments, the reaction temperature may be from about 100° C. to about 350° C., and in other embodiments, the reaction temperature may be from about 200° C. to about 310° C. In further embodiments, the temperature may be changed during the reaction within the ranges provided above without limitation.

In various embodiments, the oligomerization methods of the invention may be carried out under a reduced pressure, and in some embodiments, the reaction mixture may be purge. The pressure of the reaction vessel is, generally, chosen to aid in the removal of volatile reaction products, excess reagents, and volatile oligomerization catalysts such as the phosphonium catalyst described above from the reaction vessel during oligomerization. In certain embodiments, the pressure may be selected to allow for the removal volatile compounds, such as phenol generated by the reaction and heating. Without limitation, the pressure may range from above atmospheric pressure to below atmospheric pressure, and the person of ordinary skill in the art can determine an appropriate pressure to achieve this effect based on the components of the reaction mixture. In more specific exemplary embodiments, the pressure from about 760 mm Hg to about 0.05 mm Hg, about 500 mm Hg to about 0.1 mm Hg, or about 400 mm Hg to about 0.3 mm Hg in the reaction vessel at any time during the reaction.

Generally, the reaction is completed when excess reagents and volatile reaction products are removed from the vessel in an amount to provide an oligomeric phosphonate having the desired transparency, Tg, Mw, relative viscosity, and polydispersity for the intended use. The reaction time may depend upon a number of factors including, but not limited to, the reaction temperature, concentration of components, total volume of the reaction mixture, rate of removal of reactants from the vessel, the addition of catalyst, the inclusion of various heating steps, and the like, and combinations thereof. During the oligomerization, volatile compounds such as phenol are evolved and can be distilled off at elevated temperature, under reduced pressure and/or purge with inert gas. The reaction may be continued until the required degree of condensation is reached, and in some embodiments, the degree of condensation can be determined based on a decrease or cessation of the evolution of volatile compounds. In some embodiments, the reaction time may be less than about 10 hours. For example, in various embodiments, the reaction time may be from about 3 hours to about 8 hours, about 4 hours to about 6 hours, or any time there between.

Various embodiments are directed to methods in which oligomerization is carried out "in a melt" under conditions necessary for "melt oligomerization." The reaction conditions for melt oligomerization are not particularly limited, and melt oligomerization can be conducted in a wide range of operating conditions. In particular embodiments, melt oligomerization may refer to the conditions necessary to effect reaction between the diaryl alkyl phosphonate, or diaryl alkyl phosphonate combined with a diaryl carbonate, a diaryl ester or oligomers thereof, and one or more dihydroxy aromatic co-monomer with a volatile transesterification catalyst. In general, such reactions can be carried out in a moisture and oxygen-free atmosphere under reduced pressure and/or a purge of an inert gas such as, for example, nitrogen or argon. The temperature of the reaction vessel for such melt oligomerization methods may be from about 100° C. to 350° C. or, in certain embodiments, from 200° C. to 310° C.

In some embodiments, melt oligomerization may be carried out in one or more stages such as those described above, and in particular embodiments, the oligomerization stages may include the addition of additional oligomerization catalysts. For example, in some embodiments, a oligomerization catalyst and/or co-catalysts may be added to the reaction mixture melt together in a stage, and in other embodiments, a oligomerization catalyst may be added to a reaction mixture in one stage and a co-catalyst may be added to the reaction mixture in a different stage. In still other embodiments, an oligomerization catalyst may be added in a continuous or semi-continuous manner to the reaction mixture where one or more stages of the process are combined to form a continuous process. Thus, embodiments include preparation of oligomeric phosphonates, random or block co-oligo(phosphonate ester)s and co-oligo(phosphonate carbonate)s, random or block co-oligo(phosphonate ester)s and co-oligo(phosphonate carbonate)s in batch or continuous flow processes.

In still other embodiments, co-oligo(phosphonate ester)s and co-oligo(phosphonate carbonate)s may be prepared by combining phosphonic acid diaryl ester, diaryl carbonate or diaryl ester monomers, and the aromatic dihydroxy co-monomer with catalyst to create a reaction mixture and heating this mixture. A branching agent can be added or additional branching agent can be added during the heating step while the monomers are oligomerizing. In further embodiments, such methods may be carried out in the absence of a branching agent to provide oligomeric phosphonates, random co-oligo(phosphonate ester)s and co-oligo(phosphonate carbonate)s, and block co-oligo(phosphonate ester)s and co-oligo(phosphonate carbonate)s that are substantially unbranched.

In general, the heating may be stopped when volatile by-products of the reaction such as phenol are no longer evolved from the reaction; however, in some embodiments, a second heating step may be employed after the evolution of volatile by-products has stopped. This second heating step may provide a devolatilization step in which residual monomers, and in certain embodiments, residual co-monomer, and remaining volatile by-products are removed without increasing the molecular weight of the oligophosphonates, co-oligo(phosphonate ester)s, or co-oligo(phosphonate carbonate)s.

In some embodiments, the pressure and the temperature may be adjusted during the oligomerization reaction to create two or more stages during the course of the reaction, and in certain, embodiments, reactants or oligomerization catalysts may be added to the reaction mixture during one or more of such stages. For example, in some embodiments, the reaction may have at least two stages: a first stage that is carried out until generation of volatile compounds has stopped or is significantly reduced, and a second, post reaction, stage in which generation of volatile compounds is minimal. In such embodiments, the first stage may be from about 1 hours to about 6 hours, and the second stage may be from about 1 hours to about 6 hours, the reaction temperature of the first and second stage may, independently, be from about 100° C. to about 350° C., and both the first and second stages may be carried out at reduced pressure. Without wishing to be bound by theory, methods that include a second stage may produce oligomeric phosphonates having hydrolytic stability that is better than methods having only one stage.

In other embodiments, the methods may be composed of more than one or more than two stages. For example, in some embodiments the reaction temperature may be increased incrementally while the volatile compounds are generated, to control the rate of reaction, the rate of evolution of volatile compounds, and/or the pressure in the reaction vessel. In each individual step, the pressure, the temperature or both the temperature and pressure may be increased or decreased. For example, in some embodiments, the temperature may be increased in a first step while the pressure is held constant, and the pressure may be increased in a second step while the temperature remains constant. In a third step, the temperature may be increased and the pressure may be decreased simultaneously, and the temperature may be decreased and the pressure may be increased simultaneously in a fourth step. Embodiments may further include a step in which the temperature and pressure within the vessel are maintained. Such steps may be combined in any order, and in other exemplary embodiments additional similar steps may be incorporated into the methods of embodiments. The number of reaction steps, or stages, is not limited, and in various embodiments, the number of reaction steps may be from 2 to 10, from 3 to 8, and in certain embodiments, from 5 to 7 and any number between these ranges.

In some exemplary embodiments, the reaction temperature for each step of the method may be from about 150° C. to about 400° C., and in other embodiments, the reaction temperature for each step of the method may be from about 180° C. to about 330° C. In such embodiments, the residence time for each step may be from about 15 minutes to about 6 hours, and pressure for each step may be from about 250 mbar to about 0.01 mbar. In some embodiments, the reaction temperature may increase from one step to the other and the pressure may decrease from one step to the next.

For example, in some embodiments, transesterification reaction of the aromatic dihydroxide, diaryl carbonate, diaryl alkylphosphonate and at least one catalyst in the melt is preferably carried out in a two-step process. In the first stage, the melting of the aromatic dihydroxide, diaryl carbonate, and diaryl alkylphosphonate may be carried out at a temperature of from about 80° C. to about 250° C., about 100° C. to about 230° C., and, in certain embodiments, from about 120° C. to about 190° C. The first stage may be carried out under atmospheric pressure and may be carried out for from about 0 hours to about 5 hours and, in some embodiments, from about 0.25 hour to about 3 hours. After melting, a catalyst may be added to the melt, and co-oligo(phosphonate carbonate)s may be prepared from the aromatic dihydroxide, diaryl carbonate and diaryl alkylphosphonate by applying a vacuum (up to about 2 mmHg), increasing the temperature (up to about 260° C.), and distilling off monophenol produced as a by-product of the condensation. The co-oligo(phosphonate carbonate) thus prepared may have an average molecular weight Mw in the range of from about 1,000 to about 18,000, and in some embodiments, from about 1,000 to about 11,000. In such embodiments, up to about 80% of the monophenol can be recovered from the process.

In a second stage, the reaction temperature may be increased to from about 250° C. to 320° C. or about 270° C. to about 295° C., and the pressure may be reduced to less than about 2 mmHg. Additional by-product monophenols may be recovered in the second step. The amount of monophenol produced in the second step may be less than the amount of monophenol produced in the first step as the monophenol are a result loss of end groups in the co-oligo(phosphonate carbonate)s in the reaction. For example, the amount of monophenol produced may be less than about 5%, less than about 2%, or less than about 1% of the amount of monophenol produced in the first step.

The monophenols eliminated during transesterification of the aromatic dihydroxide, diaryl carbonate, diaryl alkylphosphonate in the production of oligomeric phosphonates of the invention may be purified and isolated, prior to the use in the diaryl carbonate synthesis. The crude monophenols isolated during transesterification may be contaminated, inter alia, with diaryl carbonates, diaryl alkylphosphonate, aromatic dihydroxide, salicylic acid, isopropenylphenol, phenyl phenoxybenzoate, xanthone, hydroxymonoaryl carbonate, and the like depending on transesterification conditions and distillation conditions. The purification can be affected by the customary purification processes, e.g., distillation or recrystallization. The purity of the monophenols following purification may be greater than 99%, greater than 99.8%, or greater than 99.95%.

Methods for making the oligomeric phosphonates of the invention can be conducted as a batch, semibatch, or a continuous process. The structure of reactors used in such methods is not particularly limited so long as the reactor has an ordinary capability of stirring, heating, reduced pressure, and includes ports for addition and removal of reagents, solvents, removable catalyst, and/or or reaction by-products. Such reactors can be equipped, for example, with a temperature controlled condenser or cold finger, for the selective removal of by-product hydroxy aromatic compounds or phenol derived compounds generated during oligomerization.

The methods of various embodiments may be carried out in, for example, stirred tanks, thin-film evaporators, falling-film evaporators, stirred tank cascades, extruders, kneaders, simple disc reactors, disc reactors for high viscosity substances, and combinations thereof. The devices, apparatuses, and reactors suitable for the individual reaction evaporator stages may depend on the course of the process and may include, but are not limited to, heat exchangers, flash apparatuses, separators, columns, evaporators, stirred containers, reactors, and any other commercially available apparatuses which provide the necessary residence time at selected temperatures and pressures. The chosen devices must permit the necessary heat input and must be designed so that they are suitable for the continuously increasing melt viscosity. The various devices may be connected to one another via pumps, pipelines, valves, and the like, and combinations thereof. The pipelines between all facilities are preferably as short as possible and the number of bends in the pipes kept as small as possible in order to avoid unnecessarily prolonging residence times.

Other embodiments of the invention are directed to oligomer compositions including at least one oligophosphonate, random or block co-oligo(phosphonate ester) and co-oligo(phosphonate carbonate), random or block co-oligo (phosphonate ester) and co-oligo(phosphonate carbonate) and at least one polymer or second oligomer or monomer. Such compositions including an oligomeric phosphonate and a polymer or second oligomer or monomer are referred to herein as "polymer compositions." The at least one polymer or second oligomer or monomer may be any commodity or engineering plastic, and such polymer compositions can be produced by blending, mixing, or compounding the constituent polymers and oligomers. "Engineering plastics" as used herein include, both thermoplastics and thermosetting resins and may include, but are not limited to, polycarbonates, epoxies derived polymers, polyepoxies (e.g., polymers resulting from the reaction of one or more epoxy monomer or oligomer with one or more chain extender or curing agent such as a mono or multifunctional phenol, amine, benzoxazine, anhydride or combination thereof), benzoxazines, polyacrylates, polyacrylonitriles, polyesters, such as, poly(ethylene terephthalate), poly(trimethylene terephthalate), and poly(butylene terephthalate), unsaturated polyesters, polyamides, polystyrenes including high impact strength polystyrene, polyureas, polyurethanes, polyphosphonates, polyphosphates, poly(acrylonitrile butadiene styrene)s, polyimides, polyarylates, poly(arylene ether)s, polyethylenes, polypropylenes, polyphenylene sulfides, poly(vinyl esters)s, polyvinyl chlorides, bismaleimide polymers, polyanhydrides, liquid crystalline polymers, cellulose polymers, or any combination thereof. The polymer or second oligomer may, therefore, include, or partially include one or more polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, polyether, polyphenylene oxide, cellulose polymer, benzoxazine, a hydrolytically stable polyphosphonate, and the like and combinations of these. In some embodiments, the polymer or second oligomer or monomer may contain functional groups that are capable of chemically reacting with the oligomeric phosphonates of embodiments.

Due to the structure and properties of the oligomeric phosphonates of embodiments, the polymer compositions described herein may exhibit exceptional flame resistance and good melt processing characteristics. For example, in general, polymer compositions of the invention may exhibit a limiting oxygen index (LOI) of at least about 27. The oligomeric phosphonates of the invention further provide flame resistance and dimensional stability while maintaining high heat deflection temperature (HDT) near that of the unmodified engineering polymers.

In some embodiments, the oligomeric phosphonates of the invention may be combined with a prepolymer mixture composed of components selected to create a polymer such as those described above under conditions appropriate for polymerization. For example, in various embodiments, a oligomeric phosphonate such as those described above may be combined with a prepolymer mixture including monomers for creating polycarbonate, polyacrylate, polyacrylonitrile, polyester, polyamide, polystyrene, polyurethane, polyurea, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, polyether, polyphenylene oxide, cellulose polymer, benzoxazine, a hydrolytically stable polyphosphonate, and the like, and this mixture may be heated and mixed until a viscous polymer is formed, or in other embodiments, a curing agent may be provided to the mixture and mixing may continue until a cured polymer is formed.

In particular embodiments, the polymer combined with the oligomeric phosphonates of the invention may be an epoxy resin. For example, in some embodiments, an oligomeric phosphonate may be combined with an epoxy resin or a prepolymer or mixture of appropriate monomers to produce an epoxy resin. Any epoxy resin can be used in such embodiments, and in certain embodiments, the resin may contain glycidyl groups, alicyclic epoxy groups, oxirane groups, ethoxyline groups, or similar epoxy groups or combinations thereof that can react with hydroxyl or epoxy resins associated with the oligomeric phosphonates. Such epoxy resins are well known in the art and include, but are not limited to, novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylol-propane type epoxy resin, terpene-modified epoxy resin, linear aliphatic epoxy resin obtained by oxidizing olefin bonds with peracetic acid or a similar peracid, alicyclic epoxy resin, or sulfur-containing epoxy resin. In some embodiments, the epoxy resin may be composed of two or more epoxy resins of any of the aforementioned types. In particular embodiments, the epoxy resins may be aralkyl-type epoxy resins, such as epoxy resins derived from bisphenol A or methylene dianiline. The epoxy may also contain one or more additional components such as, for example, an additional hardener like a novolac hardener or a benzoxazine compound or resin, and in some embodiments, the oligomeric phosphonate may be used as epoxy modifiers, crosslinkers for epoxy resins, or epoxy hardeners in such epoxy resin polymer compositions.

In some embodiments the polymer compositions described here may further include additional components fillers, fibers, such as, but not limited to, chopped or continuous glass fiber, metal fibers, aramid fibers, carbon fibers, or ceramic fibers, silicates, surfactants, organic binders, polymeric binders, crosslinking agents, diluents, coupling agents, flame retardant agents, anti-dripping agents such as fluorinated polyolefins, silicones, and, lubricants, mould release agents such as pentaerythritol tetrastearate, nucleating agents, anti-static agents such as conductive blacks, carbon nanotubes, and organic antistatics such as polyalkylene ethers, alkylsulfonates, perfluor sulfonic acid, perfluorobutane sulfinic acid potassium salt, and polyamide-containing polymers, catalysts, colorants, inks, dyes, antioxidants, stabilizers, and the like and any combinations thereof. In such embodiments, the one or more additional components or additives may make up from about 0.001 wt. % to about 1 wt. %, about 0.005 wt. % to about 0.9 wt. %, about 0.005 wt. % to about 0.8 wt. %, about 0.04 wt. % to about 0.8 wt. %, and in particular embodiments, from about 0.04 wt. % to about 0.6 wt. % based on the total composition. In other embodiments, additional components such as glass fiber or other fillers may be provided at much higher concentrations up to 70 volume (vol.) %. For example, in some embodiments the oligomeric phosphonates polymer compositions may include up to about 70 vol. % glass fiber, and in other embodiments, the oligomeric polymer compositions may include from about 5 vol. % to about 70 vol. %, from about 10 vol. % to about 60 vol. %, or about 20 vol. % to about 50 vol. % glass fiber.

Polymer compositions including oligomeric phosphonates and other engineering polymers and/or additional components or additives can be prepared by conventional means. For example, in some embodiments, the respective constituents can be mixed in a known manner and subjected to melt compounding and/or melt extrusion at temperatures of about 200° C. to about 400° C. in customary aggregates such as internal kneaders, extruders, or twin-screw apparatuses. Mixing the individual constituents can be affected either successively or simultaneously and either at about room temperature (about 20° C.) or at higher temperature. For example, in some embodiments, the engineering plastic and/or all additional components or additives can be introduced into the oligomeric phosphonates, by compounding. In other embodiments, the individual constituents can be introduced separately in different stages of the preparation process into a melt including oligomeric phosphonates. Thus, for example, additives can be introduced during or at the end of the transesterification of aromatic dihydroxides with organic carbonates and diphenylmethyl phosphonate, before or during the formation of oligomeric phosphonates or before or after the polycondensation of the oligomeric phosphonates into a melt.

The form of addition of the compounds according to the invention is not limited. For example, the engineering plastics and/or additional components or additives can be added as solids such as a powder, as concentrate in polycarbonate powder in solution. In industrial embodiments, a side extruder may be operated with a throughput of, for example, 200-1000 kg of oligomeric phosphonate per hour.

The polymer compositions of various embodiments can be used in any application in which a flame retardant polymer is useful. For example, in some embodiments, the polymer compositions of the invention may be used as coatings on plastics, metals, glass, carbon, ceramic, or wood products which can be in a variety of forms, for example as a fiber, molding, laminate, foam, extruded shape or the like, and in other embodiments, the polymer compositions of the invention can be used to fabricate free-standing films, fibers, foams, molded articles, and fiber reinforced composites. Such articles may be well-suited for applications requiring flame resistance. The oligomeric phosphonates of the invention and polymer compositions, including such oligomeric phosphonates, may exhibit outstanding flame resistance and good melt processability making these materials useful in applications for the automotive and electronic sectors that require outstanding fire retardancy, high temperature performance, and melt processability. In addition, these articles may be well suited for a variety of applications as support parts, electrical components, electrical connectors, printed wiring laminated boards, electrical or electromagnetic housings, electrical or electromagnetic subcomponents and components in consumer products that must meet UL or other standardized fire resistance standards.

In some embodiments, the polymer compositions including the oligomeric phosphonates of the invention may be combined with other components or reinforcing materials. For example, in various embodiments, continuous or chopped glass fibers, carbon black or carbon fibers, ceramic particles or fibers, or other organic materials may be included in the polymer compositions of the invention. In particular embodiments, continuous or chopped glass fibers, carbon fibers, ceramic fibers, or other organic materials may be combined with a polymer mixture including an epoxy resin to create a prepreg to prepare laminates. Such laminates may be used to fabricate components such as laminated circuit boards that can be incorporated into articles of manufacture such as electronic goods such as, for example, televisions, computers, laptop computers, printers, cell phones, video games, DVD players, stereos and other consumer electronics.

The oligomeric phosphonates prepared as described above, and polymer compositions including these oligomeric phosphonates are generally self-extinguishing, i.e., they stop burning when removed from a flame and any drops produced by melting in a flame stop burning are almost instantly extinguishes and do not readily propagate fire to any surrounding materials. Moreover, these polymer compositions do not evolve noticeable smoke when a flame is applied.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples. The following examples are for illustrative purposes only and are not to be construed as limiting the invention in any manner.

Analytical Characterization

Molecular weight distributions were determined by measuring 0.2% solutions of oligomer in tetrahydrofuran (THF) by gel permeation chromatography (GPC) with UV detection (at 254 nm). Calibration of the instrument was conducted with linear polystyrene (PS) standards of known molecular weights. The weight average (Mw) and number average (Mn) were evaluated from the chromatograms by using WinGPC software.

End-group analysis was performed using a Bruker Daltonics Reflex III Matrix Assisted Laser Desorption/Ionization Time-of-Flight (MALDI-TOF) instrument. The samples were prepared using dithranol as the matrix material, THF as the solvent, and with no exogenous metal cation. The end-groups were determined by analysis of the peak molar mass (m/z) distribution obtained from the spectrum of each sample. The relative percent (%) of end-groups was calculated using the total sum of the peak intensities of each endgroup distribution (n=1,2,3, etc) divided by the number of repeat units in each chain "n". Chains with phenolic hydroxyl groups at both ends are defined as "Bis-OH", chains with phenyl phosphonate ester groups at both ends are defined as "Bis-phenyl", chains with a hydroxyl group at one end and a phenyl phosphonate ester group at the other end are defined as "Phenyl-OH and chains with a phenyl phosphonate ester at one end and a vinyl group at the other end is defined as "Mono-phenyl".

Hydroxyl numbers (mg KOH/g) were obtained by potentiometric titration using the acetylation method. The oligomer sample is dissolved in the acetylating solution (acetic anhydride in dry pyridine). The catalyst (5% N-dimethylaminopyridine in dry pyridine) is then added and allowed to stir for 1 hour. Deionized water is added and stirred for half an hour, before titrating with ethanolic potassium hydroxide solution to the end-point.

Example 1

Phenyl phosphonate ester terminated oligomers at both chain ends "Bis-phenyl" were synthesized in a one reactor process in a 6 L stainless steel reactor equipped with a mechanical stirrer and distillation column. To this reactor, 2,2-bis-(4-hydroxyphenyl) propane (Bisphenol A, 1100 g, 4.82 mol), diphenyl methylphosphonate (DPP) (1800 g, 7.26 mol), and the catalyst, tetraphenylphosphonium phenolate (6.5 g, 15 mmol) were added under nitrogen. The mixture was heated to 190° C. under nitrogen and then increased from 200° C. to 270° C. over 450 minutes, while maintaining the pressure at 15 kPa. The reactor temperature was held at 270° C. for another 360 minutes, while gradually decreasing pressure to 0.03 kPa (full vacuum). The product was extruded through the die at the bottom of the reactor into a liquid nitrogen bath and isolated as a coarse white granulate product.

Example 2

Phenyl phosphonate ester terminated oligomers at both chain ends "Bis-phenyl" were synthesized in a single reactor via a melt condensation process. A 1.7× molar excess of diphenyl methylphosphonate (DPP) was added to 2,2-bis-(4-hydroxyphenyl)propane (Bisphenol A) under nitrogen. The catalyst tetraphenyl-phosphonium phenolate was added to the monomers in the melt at a concentration of 0.62 mmol/mol Bisphenol A. The monomer/catalyst mixture was heated to 190° C. to start the reaction, while decreasing the pressure to 30 kPa, and then gradually raising the temperature from 190° C. to 290° C., while reducing the pressure from 30 to 0.06 kPa over 580 minutes. Excess diphenyl methylphosphonate monomer was removed by holding the reaction at 290° C. under full vacuum (0.06 kPa) for another 800 minutes. The product was extracted via under water pelletization, dried and isolated as clear white pellets.

Example 3

Phosphonate oligomers with a mixture of end groups were synthesized via a two-stage melt condensation process. An equimolar amount of 2,2-bis-(4-hydroxyphenyl) propane (Bisphenol A) was added to diphenyl methylphosphonate under nitrogen. The catalyst tetraphenylphosphonium phenolate was added to the monomers at a concentration of 0.2 mmol/mol Bisphenol A. The monomer/catalyst mixture was heated to 260° C. for 60 minutes and then gradually increased from 260° C. to 280° C., while reducing the pressure from 30 to 1.5 kPa over 360 minutes. The product was extruded through the die at the bottom of the reactor into a liquid nitrogen bath and isolated as a coarse white granulate product.

Example 4

Phosphonate oligomers with about 50% hydroxyl endgroups at both chain ends "Bis-OH" were synthesized via a two-stage melt condensation process. A 1.2× molar excess of 2,2-bis-(4-hydroxyphenyl) propane (Bisphenol A) was added to diphenyl methylphosphonate under nitrogen. The catalyst tetraphenylphosphonium phenolate (30% phenol) was added to the monomers at a concentration of 0.3 mmol/mol Bisphenol A. The monomer/catalyst mixture was heated to 260° C. to start the reaction and then gradually heated to 275° C., while reducing the pressure from 30 to 0.05 kPa over a total of 420 minutes. The product was extracted via under water pelletization, dried and isolated as clear off-white pellets.

Comparative Example 1

Phosphonate oligomers with >95% phenolic hydroxyl end groups at both chain ends "Bis-OH" were synthesized via a two-stage melt condensation process. A 1.2× molar excess of 2,2-bis-(4-hydroxyphenyl) propane (Bisphenol A) was added to diphenyl methylphosphonate under nitrogen. The catalyst tetraphenylphosphonium phenolate (30% phenol) was added to the monomers at a concentration of 0.3 mmol/mol Bisphenol A. Step-wise increase of the temperature from 190° C. to start the reaction and then gradually heated from 190° C. to 290° C., while reducing the pressure from 30 to 0.06 kPa over 580 minutes. The product was extracted via under water pelletization, dried and isolated as clear white pellets.

Table 1 provides a comparison of the characterization data of the products obtained from the reactions described in Examples 1-4 and Comparative Example 1.

TABLE I

| | Example 1 | Example 2 | Example 3 | Example 4 | Comparative Example 1 |
|---|---|---|---|---|---|
| Mn [g/mole] | 2100 | 4100 | 1800 | 2200 | 2300 |
| Tg [° C.] | 69 | 74 | 70 | 84 | 96 |
| Bis-OH Content % | 0 | 0 | 9 | 47 | 98 |
| Bis-phenyl Content % | 100 | 98 | 45 | 0 | 0 |
| Phenyl-OH Content % | 0 | 0 | 46 | 28 | 1 |
| Mono-phenyl content % | 0 | 2 | 0 | 25 | 1 |
| OH # (mg KOH/g) | 0 | 0 | 29 | 40 | 48 |

The curing reaction of the 4 phosphonate oligomers described in Example 1-4, and Comparative Example 1 was studied using FTIR (Bruker Tensor 27) in ATR mode. A 50 wt % MEK solution consisting of 39 wt % phosphonate oligomer, 60.8 wt % Epoxy E164 resin and 0.2 wt % of the catalyst 2-ethyl-4-methyl-imidazole (2E4MI) was stirred until uniformly mixed. The resin formulation was poured into eight separate aluminum pans (2 g each) for each time (t0, t15, t30, t45, t60, t90, t120). The samples were placed into a vacuum oven at 50° C. for 1 hour to remove MEK solvent, then transferred to a convection oven at 190° C. The samples were then removed from the oven at the specific time intervals (15, 30, 45, 60, 90, 120, and 180 minutes) and analyzed by FTIR. Similar to Comparative Example 1, samples from Examples 1-4 had all hardened (cured) after 180 min.

Figure 2:
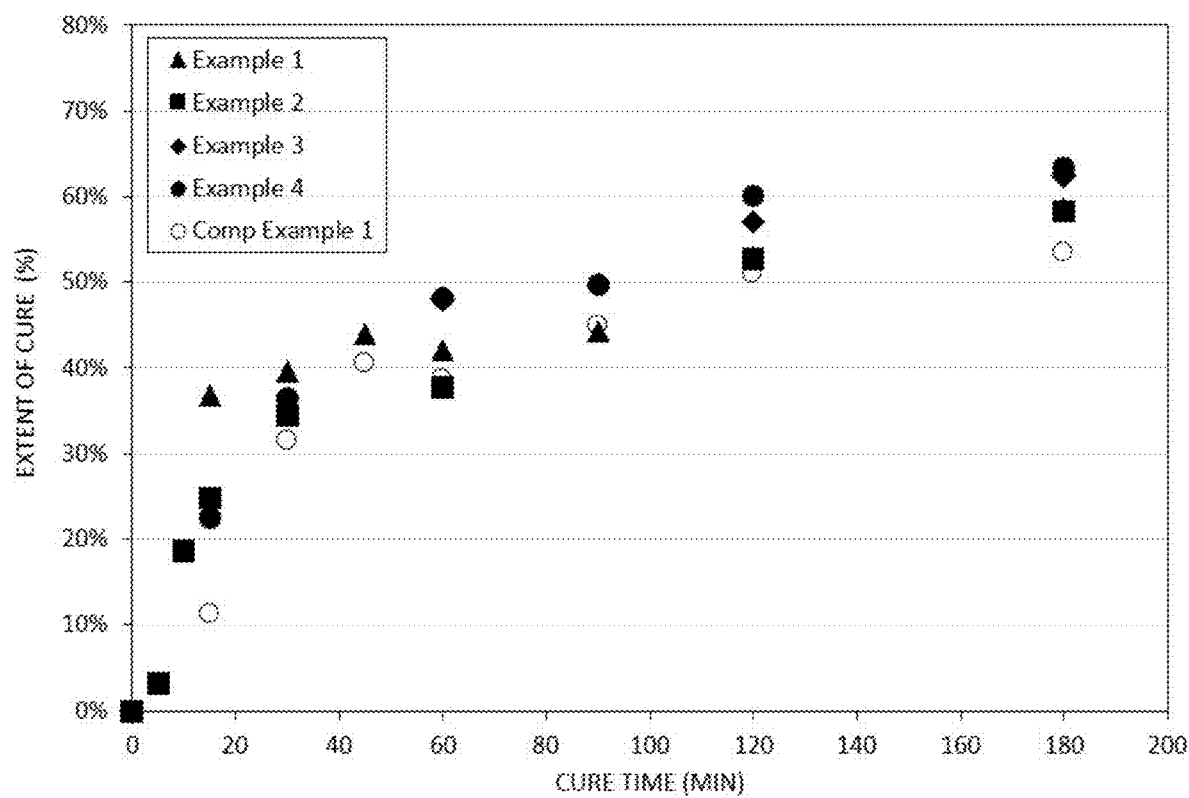
FIG. 2 is a graph illustrating extent of cure vs. time for various embodiments described herein.

An example of a typical FTIR spectra of the epoxy-phosphonate formulation and changes over time are shown in FIG. 1. The stretching peaks at 930 $cm^{-1}$ was used to monitor the curing reaction. The peak at 930 $cm^{-1}$ disappears over time and is assigned to the C—O stretching of the epoxy ring and partial overlapping P—O—Ar (Ar-aromatic) stretching of the phosphonate ester. In the presence of imidazole catalyst, the ring opening reaction of the epoxy occurs, the C—O ring peak disappears converting to a secondary hydroxyl anion which reacts with the phenolic-OH groups of the phosphonate oligomers. The extent of cure shown in FIG. 2 is calculated as a percentage of the peak area at time t15, t30, t45, t60, t90, t120 and t180 versus the peak area at time t=0. The peak at 1507 $cm^{-1}$ is used as the reference peak. As expected, the Comparative Example 1, containing reactive phenolic-OH groups show a progressing reaction with time of the oligomers with the epoxy resin. Surprisingly, the speed and extent of the reaction of the two oligomers without reactive phenolic-OH end groups from Examples 1 and 2 was not significantly different when compared to Comparative Example 1. Therefore, phosphonate oligomers containing high levels (>98%) of bis-phenyl endgroups can also be used as curing agents for epoxy resins. In the absence of phenolic-OH endgroups (or once all phenolic endgroups are consumed) the secondary hydroxyl anion, reacts at the P—O—Ar site of the phosphonate backbone forming crosslinks between the epoxy resin and the phosphonate oligomer and the P—O—Ar stretching peak also disappears over time.

Thus, it may not be required to use special reaction conditions during the production process of these oligomers, aiming for material with only reactive phenolic hydroxyl end groups and/or high levels of bis-OH terminated oligomers.

FR TESTING

Test bars (125 mm×13 mm×4 mm thick) of the formulations containing the oligomers described in examples 1-3 and Comparative Example 1 were prepared and cured in an oven at 190° C. for 2 hrs. All samples had equivalent loading levels of the phosphonate oligomer in the epoxy resin (39 wt %). A UL 94 vertical burn chamber was used for screening of the FR performance of the test samples. The bars were suspended along the vertical axis and a ¾ inch flame is applied to the sample for 10 seconds. The time to self-extinguish after the first ($t_1$) and second ($t_2$) exposure was recorded. For V0 rating, the maximum burning time after removal of the ignition flame (tmax) should not exceed 10 seconds and the total burning time (t1+t2) for five tested specimens should not exceed 50 seconds.

Table 2 shows all the samples containing the phosphonate oligomers achieve a V0 rating each test. The results show that the flame retardancy of the cured product is independent of the end-groups of the phosphonate oligomers used to cure the epoxy resin. Both high level of bis-OH and high levels of bis-phenyl and the range of both end-groups in between provide the same FR efficacy.

TABLE 2

| Test bar # | Vertical burn tests | Example 1 | Example 2 | Example 3 | Comparative Example 1 |
|---|---|---|---|---|---|
| 1 | t1 | 1 | 0 | 1 | 0 |
|   | t2 | 1 | 1 | 0 | 1 |
| 2 | t1 | 0 | 0 | 0 | 0 |
|   | t2 | 2 | 1 | 2 | 1 |
| 3 | t1 | 0 | 0 | 0 | 0 |
|   | t2 | 2 | 3 | 1 | 1 |
| 4 | t1 | 0 | 0 | 0 | 0 |
|   | t2 | 1 | 0 | 1 | 0 |
| 5 | t1 | 0 | 0 | 0 | 0 |
|   | t2 | 0 | 2 | 2 | 0 |

What is claimed is:

1. A composition comprising:
   oligomeric phosphonates, wherein at least 50% of the total oligomeric phosphonates have one or more non-reactive end-groups,
   wherein the oligophosphonates comprise termini and the non-reactive end groups comprise from 50% to 99% of the termini.

2. The composition of claim 1, wherein the oligomeric phosphonate comprises an oligophosphonate, random or block co-oligo(phosphonate ester) and co-oligo(phosphonate carbonate).

3. The composition of claim 1, wherein the oligomeric phosphonates comprises linear oligomeric phosphonates, branched oligomeric phosphonates, or a combination thereof.

4. The composition of claim 1, wherein the oligomeric phosphonates comprise a number averaged molecular weight of from about 500 g/mole to about 5000 g/mole.

5. The composition of claim 1, wherein oligomeric phosphonates comprise units derived from bisphenol.

6. The composition of claim 1, wherein the oligomeric phosphonate comprises units of Formula I:

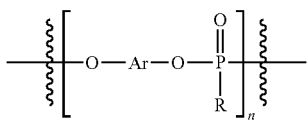

wherein:

Ar is an aromatic group and —O—Ar—O— is derived from a dihydroxy compound having one or more aryl rings;

R is a $C_{1-20}$ alkyl, $C_{2-20}$ alkene, $C_{2-20}$ alkyne, $C_{5-20}$ cycloalkyl, or $C_{6-20}$ aryl; and n is an integer from 2 to about 20.

7. The composition of claim 6, wherein —O—Ar—O— is derived from resorcinol, hydroquinone, bisphenol A, bisphenol F, 4,4'-biphenol, phenolphthalein and phenolphthalein derivatives, 4,4'-thiodiphenol, 4,4'-sulfonyldiphenol, 3,3,5-trimethylcyclohexyldiphenol, or combinations thereof.

8. The composition of claim 1, wherein the non-reactive end groups comprise about 90% to about 98% of the termini.

9. The composition of claim 1, wherein the non-reactive end groups comprise greater than 90% of the total termini of the oligomeric phosphonates.

10. The composition of claim 1, wherein the termini further comprise less than 40% of reactive end groups.

11. The composition of claim 10 wherein the reactive end groups comprise about 15% to about 0.2% of the total number of termini.

12. The composition of claim 11 wherein the reactive end groups comprise about 10% to about 0.5%.

13. The composition of claim 11 where the reactive end groups comprise phenolic-OH end groups and the total termini comprise less than 60% phenolic-OH end groups.

14. The composition of claim 11 where the termini comprise more than 80% phenyl end groups.

15. The composition of claim 11 where the termini comprise less than about 40% Bis-OH end groups.

16. The composition of claim 11, wherein reactive end groups comprise aromatic hydroxyl end groups.

17. The composition of claim 1, further comprising one or more thermoset polymer.

18. The composition of claim 17, wherein the one or more thermoset polymer is an epoxy.

19. The composition of claim 17, further comprising at least one hardener.

* * * * *